Feb. 7, 1933.  L. HAUBERT  1,896,488
PULLING IMPLEMENT
Filed Aug. 27, 1929   2 Sheets-Sheet 1
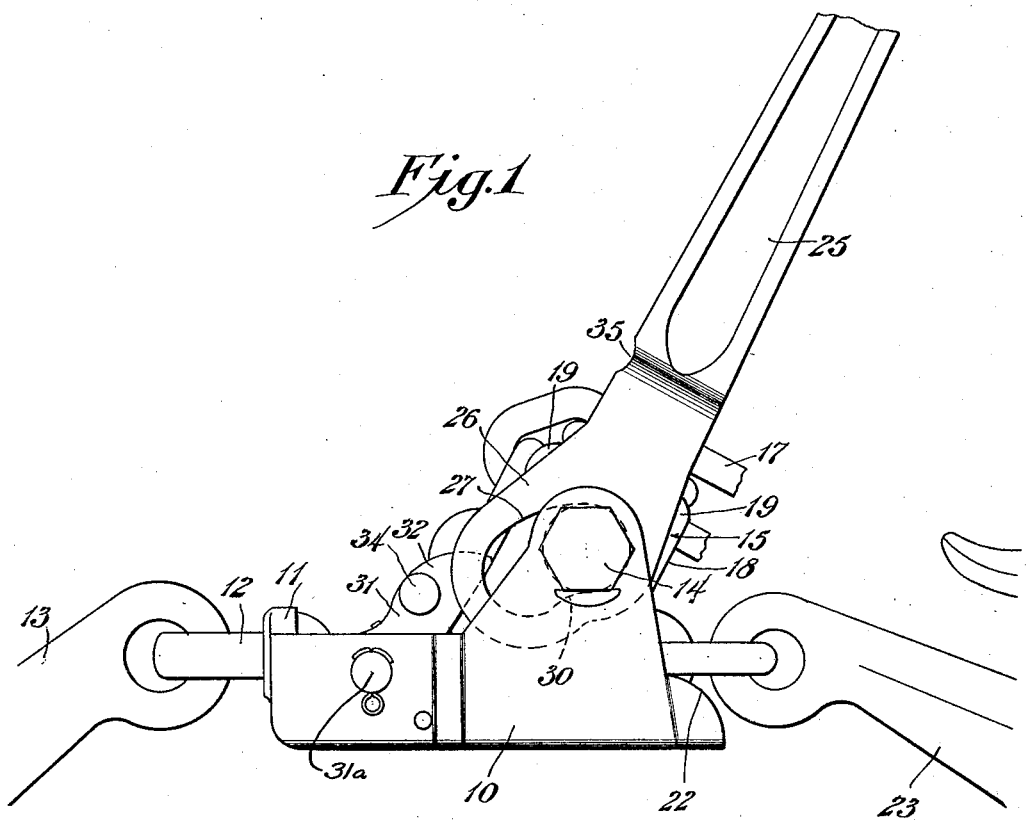
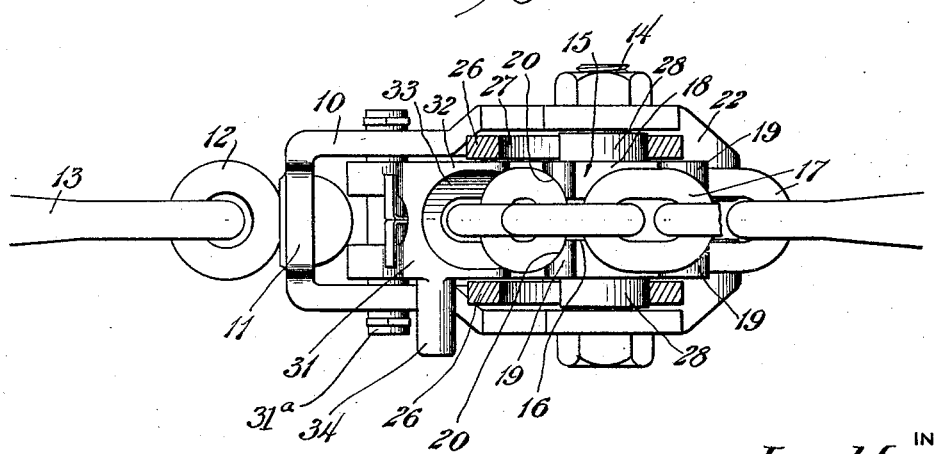
INVENTOR
Leo Haubert
BY
Siggers + Adams
ATTORNEYS Feb. 7, 1933.   L. HAUBERT   1,896,488
PULLING IMPLEMENT
Filed Aug. 27, 1929   2 Sheets-Sheet 2
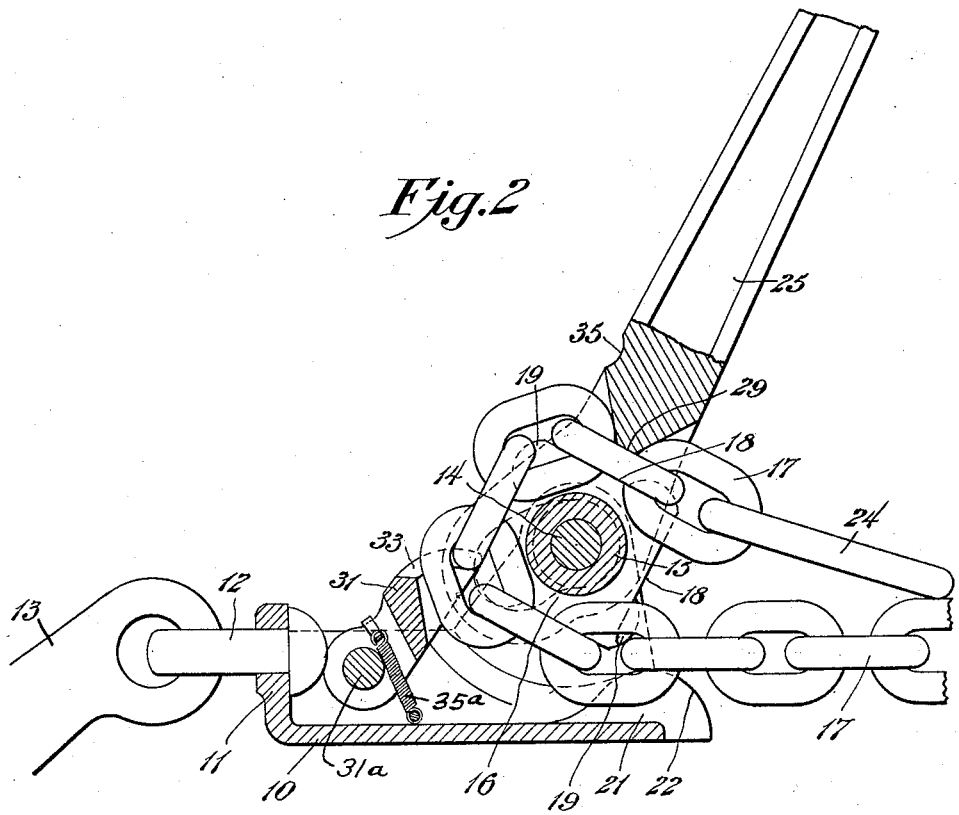
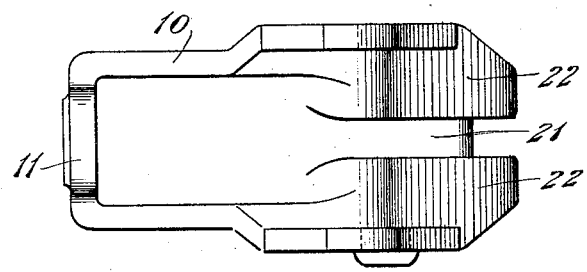
INVENTOR
Leo Haubert
BY
Siggers + Adams
ATTORNEYS Patented Feb. 7, 1933

1,896,488

UNITED STATES PATENT OFFICE

LEO HAUBERT, OF TULSA, OKLAHOMA, ASSIGNOR OF ONE-HALF TO LYMAN LE ROY ROLLER, OF TULSA, OKLAHOMA

PULLING IMPLEMENT

Application filed August 27, 1929. Serial No. 388,780.

This invention relates to pulling implements and, among other objects, aims to provide an improved lever-operated chain tightener and hoisting device wherein a chain is trained over a sheave and the lever is utilized to take up the slack in the chain step-by-step, or one bite at a time. Other objects and advantages will appear in the specification.

This application is a continuation in part of my co-pending application, Serial No. 323,009, filed December 1, 1928.

In the accompanying drawings wherein one embodiment of the invention is shown for illustrative purposes, Fig. 1 is a side elevation of the implement;

Fig. 2 is a longitudinal central sectional view of the implement shown in Fig. 1;

Fig. 3 is a top plan view of the implement, parts being shown in section; and

Fig. 4 is a top plan view of the frame of the implement.

Referring particularly to the drawings, the working parts of the implement are shown as being mounted in an elongated frame 10 which is preferably U-shaped in cross section and is closed at the rear end by an end wall 11 to which is connected a swivel 12 and a hook 13 to engage a stationary supporting element or the thing to be lifted or tightened.

Between the side walls of the frame there is mounted on a shaft 14, herein a bolt, a sheave 15 having a central groove 16 in its periphery to receive the edgewise links of a take-up chain 17 (see Figs. 2 and 3). On the opposite sides of the groove, the sheave presents flat faces 18 against which the flatwise links of the chain are adapted to lie. Four such flats on the sheave are here shown merely for the sake of illustration. At the forward ends of the flat surfaces, integral projections 19 are formed and present curved faces 20 to conform to the flatwise chain links and prevent the chain from slipping ahead on the sheave during the tightening operations later to be described. The design of the sheave is such that the trained-over chain links conform to it, the edgewise links contacting with the bottom of groove 16 and the flatwise links contacting throughout their length with the flats 18.

To insure that the take-up chain is guided properly on the sheave, the frame 10 has a groove 21 in the bottom wall at the forward edge (Fig. 4) to receive and guide the edgewise links into the groove 16 of the sheave. As will be seen in Fig. 2, the forward end of the bottom wall is curved at 22 on the opposite sides of the groove 21 to support and guide the flatwise links and thus raise the edgewise links into engagement with the sheave groove.

The take-up chain 17 is preferably permanently associated with the sheave by means to be described. This chain preferably also has a hook 23 at one end (Fig. 1) to engage anything to be lifted, stretched or pulled as the case may be. The other end of the chain is shown in Fig. 2 as having a ring 24 that is sufficiently large to prevent the chain from being pulled off the sheave. Also this ring affords a good hand hold to enable the operator to pull on it and take up any loose slack before he starts the lever take-up operations. Moreover, when the sheave is free to turn, the take-up chain can quickly be pulled out any desired distance within the limits of its length.

As has been previously intimated, the sheave is adapted to be rotated step-by-step by means of a lever 25. In this instance, the lever has a forked end 26, the arms of which straddle the sheave and present cam slots 27 engaging hub portions 28 on opposite ends of the sheave inside of the side walls of the frame (see Fig. 3). The lever has an integral pawl 29 between the upper ends of the arms so shaped as to enable it to engage the ends of adjacent edgewise links and rest on the flatwise link between them, as shown in Fig. 2. The purpose of the cam slots 27 in the fork arms is to shift the pawl 29 into and out of engagement with the chain links, it being understood that when the upper portions of the slots 27 are seated on the hub, as in Fig. 2, the pawl 29 is held engaged with the links and cannot slip out of such engagement by virtue of inwardly curved shoulders 30 between the upper and lower ends of the slots.

To disengage the pawl 29, the lever is raised so that the bottoms of the cam slots are seated against the hubs and thus the pawl can be swung over an edgewise link. The curvature of the slots 27 is such that the rearward swinging movement of the lever 25 will automatically cause the pawl 29 to ride over the edgewise link behind it, thus lifting the lever out of active engagement with the chain, and then fall into the space between the next pair of edgewise links, the chain thus being pulled the length of one link for each double swing of the lever.

As best shown in Figs. 1 and 2, a spring-urged chain-holding pawl 31 is pivoted as on a cross pin 31ª at the rear end portion of the frame 10 and has a forked end 32 to straddle the edgewise links of the chain. The reduced forward ends of the arms of said forked end 32 are adapted to rest against the flat faces 18 on the sheave and have curved surfaces 33 which conform to and the upper ends of which engage the ends of the flatwise links, as shown in Fig. 2. This holding pawl, in the present example, has an integral lifting arm or handle 34 extending laterally beyond one side of the frame so as to facilitate swinging it out of engagement with the chain. If it is desired to disengage both the lever and pawl 31 from the chain and sheave, the pawl 31 may be swung upwardly and the lever swung rearwardly to rest on it. Herein, the lever has a transverse groove or notch 35 to engage the forked end 32 of the pawl. The sheave is then free to turn in either direction and the take-up chain can be moved freely in either direction. As soon as the lever is again lifted, the pawl 31 automatically drops into holding position. A suitable coil spring 35ª normally urges the pawl toward its gripping position.

From the foregoing description, it will be seen that the improved implement is made of a very few, simple and relatively inexpensive parts. It is sufficiently powerful to do the work of a great many cumbersome, heavy and expensive machines. Moreover, it is of sufficiently small weight to enable it to be conveniently carried from place to place and is adapted for such a wide variety of uses that it would be impracticable here to outline them.

Obviously, the present invention is not restricted to the particular embodiment thereof herein shown and described. Moreover, it is not indispensable that all the features of the invention be used conjointly, since they may be employed advantageously in various combinations and sub-combinations.

What I claim is:—

1. A pulling implement of the class described comprising in combination; a frame; a sheave in the frame; a take-up chain trained over the sheave; said sheave having a groove in its periphery to receive the edgewise links of the chain, and flat portions on opposite sides of the groove for the flatwise links; a lever having a forked end pivotally mounted to swing about the sheave axis and having arcuate cam slots to cause the lever to be shifted toward and away from the sheave; an integral pawl on the lever at the upper ends of the arms shaped to conform to and grip the links of the chain when the lever is moved to tighten the chain; and a pivoted holding pawl arranged to engage the links of the chain and permit the lever pawl to take another bite.

2. A pulling implement of the class described comprising, in combination, a frame; a chain sheave mounted in the frame; a chain on the sheave; an operating lever having a pawl arranged to engage and grip one or more of the chain links against the sheave; a pivoted holding pawl on the frame behind the sheave arranged also to grip the chain links and to hold the chain and sheave while the lever is moved to take another bite; and means on the lever to engage the holding pawl when it is swung out of engagement with the chain and thereby hold the pawl inactive so that the sheave is free to turn in either direction and the chain may be freely manipulated.

3. A pulling implement of the class described comprising, in combination, a substantially U-shaped frame; a shaft extending across the frame adjacent to the forward end; a chain sheave on the shaft having hub members at its opposite ends inside the frame and adjacent to the side walls thereof; a take-up chain trained about the sheave; an operating lever having a forked end and having arcuate cam slots; said hub members being engaged in said slots whereby said lever is pivotally mounted on said hub members; an integral chain engaging pawl on the lever adapted automatically to grip the chain when the lever is shifted to its tightening position by virtue of the shape of the cam slots and adapted automatically to be disengaged from the chain when the lever is moved in the opposite direction; and a spring-urged holding pawl pivoted in the frame so shaped and arranged as to engage one or more links of the chain and hold the chain and sheave while the lever is moved to take another bite.

4. In a pulling implement of the character described, a frame; a chain sheave mounted in the frame; said sheave having a groove adapted to receive the edgewise links of a chain; flat portions on opposite sides of the groove to receive the flatwise chain links; a take-up chain trained about the sheave; an arcuate, grooved guide at the forward end of the frame to guide the chain links properly onto the sheave; and step-by-step means to rotate the sheave including a pawl engageable with one or more of the chain links.

5. A pulling implement of the class described comprising, in combination, a frame; a chain sheave rotatably mounted in the frame; an operating lever having a pawl engageable with the links of the chain; and a holding pawl pivotally mounted in the frame also engageable with the links of the chain; said lever having a groove adapted to engage the end of the holding pawl and hold said pawl inoperative when the lever is swung to its inoperative position so that the sheave is free to turn and the chain may be manipulated thereon.

6. A pulling implement of the class described, comprising, in combination, an open frame; a chain sheave rotatably mounted in the frame; an operating lever having a forked end straddling the sheave and having a pawl engageable with the links of a chain; a take-up chain trained about the sheave; the forks of said lever having cam slots; hub members integral with the sheave and engaged in said slots; shoulder portions intermediate the ends of said slots so arranged as to cause the lever automatically to be shifted into chain-engaging position when it is moved to tighten the chain and to be disengaged from the chain when it is moved in the opposite direction to take another bite; and a holding pawl to engage the chain and sheave and hold them while the lever is being moved to take another bite.

In testimony that I claim the foregoing as my own, I have hereto affixed my signature.

LEO HAUBERT.